(12) United States Patent
Kobayashi

(10) Patent No.: US 11,283,961 B2
(45) Date of Patent: Mar. 22, 2022

(54) IMAGE FORMING APPARATUS

(71) Applicant: TOSHIBA TEC KABUSHIKI KAISHA, Tokyo (JP)

(72) Inventor: Yasukazu Kobayashi, Sunto Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 17/032,288

(22) Filed: Sep. 25, 2020

(65) Prior Publication Data

US 2021/0211553 A1 Jul. 8, 2021

(30) Foreign Application Priority Data

Jan. 8, 2020 (JP) .............................. JP2020-001638

(51) Int. Cl.
*G06F 15/00* (2006.01)
*G06F 3/12* (2006.01)
*G06K 1/00* (2006.01)
*H04N 1/21* (2006.01)
*H04N 1/00* (2006.01)

(52) U.S. Cl.
CPC ......... *H04N 1/217* (2013.01); *H04N 1/00244* (2013.01); *H04N 1/00464* (2013.01); *H04N 2201/0094* (2013.01)

(58) Field of Classification Search
CPC ............... H04N 1/217; H04N 1/00244; H04N 1/00464; H04N 2201/0094
USPC ................................ 358/1.15, 1.14, 1.13, 1.1
See application file for complete search history.

(56) References Cited

U.S. PATENT DOCUMENTS

| 9,213,922 | B2* | 12/2015 | Tanaka | G06K 15/02 |
| 2008/0263134 | A1 | 10/2008 | Machida | |
| 2009/0015515 | A1* | 1/2009 | Ichieda | H04L 67/02 |
| | | | | 345/33 |
| 2013/0208300 | A1 | 8/2013 | Sakura | |
| 2017/0094101 | A1 | 3/2017 | Saito | |
| 2018/0013916 | A1 | 1/2018 | Koujimoto et al. | |
| 2020/0285432 | A1* | 9/2020 | Mino | G06F 3/1238 |

FOREIGN PATENT DOCUMENTS

| JP | 2013-206026 A | 10/2013 |
| JP | 2014-007483 A | 1/2014 |
| JP | 2018-160900 A | 10/2018 |
| JP | 2019-064214 A | 4/2019 |

OTHER PUBLICATIONS

Extended European Search Report dated Apr. 6, 2021 issued in European Application No. 20205524, 11 pages.

* cited by examiner

*Primary Examiner* — Douglas Q Tran
(74) *Attorney, Agent, or Firm* — Foley & Lardner LLP

(57) ABSTRACT

An image processing apparatus may include a processor including a processing unit, a creating unit, and an output unit. The processing unit stores image data created by executing a job in a storage unit. The creating unit creates an information code representing information indicating a storage area of the storage unit in which the image data is stored. The output unit displays the information code created by the creating unit on a display unit.

17 Claims, 8 Drawing Sheets

IMAGE FORMING APPARATUS

CROSS-REFERENCE TO RELATED APPLICATION

This application is based upon and claims the benefit of priority from Japanese Patent Application No. 2020-001638, filed Jan. 8, 2020, the entire contents of which are incorporated herein by reference.

FIELD

Embodiments described herein relate generally to an image forming apparatus.

BACKGROUND

A multi function peripheral, printer, or product (MFP) stores a created document in the MFP or transmits the created document to an external system. When taking out the document stored in the MFP, a user needs to find out the location where the document is stored and access the document. There is also known an MFP having a function of transmitting a URL for accessing a storage destination by email.

Regarding a technique of providing a user with a created document, a technique of providing the user with an electronic file of a scanned image is known (for example, see JP-A-2014-7483). In this technique, the MFP scans a document image to input image data and converts the input image data into an electronic file in a predetermined data format. The MFP gives a file name to the electronic file converted into the predetermined data format and uploads the electronic file with the given file name to a server. The MFP prints access information including the file name of the uploaded electronic file and the address of the server. The server stores the electronic file uploaded from the MFP and receives an electronic file access request including the file name of the access information from a portable terminal. The server determines whether or not the received electronic file access request is valid based on the file name. When it is determined that the electronic file access request is valid, the server transmits the electronic file corresponding to the electronic file access request to the portable terminal.

DETAILED DESCRIPTION

Figure 1:
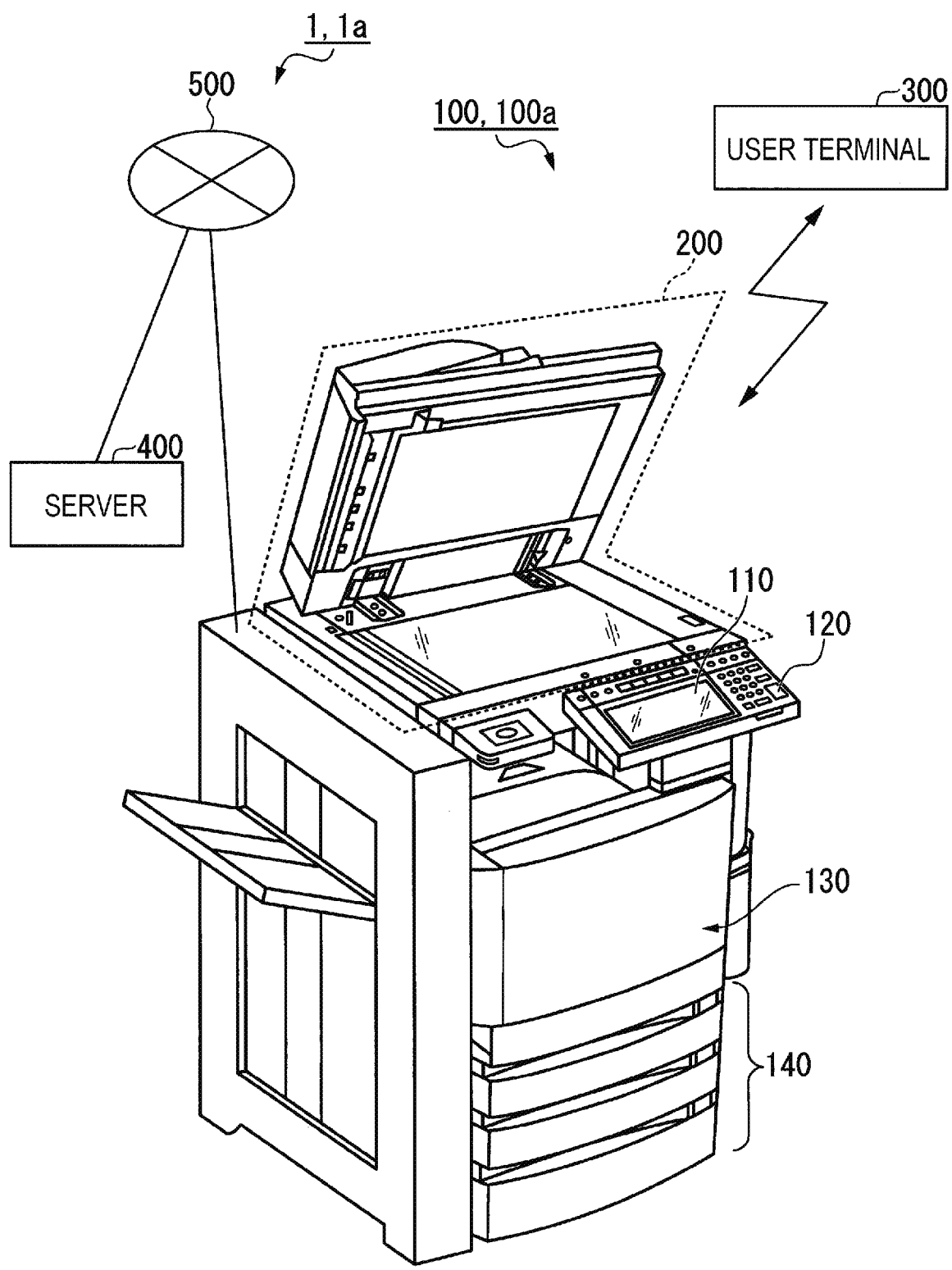
FIG. 1 is a diagram illustrating a system configuration of an image forming system according to an embodiment.

When the capacity of a memory installed in the MFP is small, the number of image data of documents that can be stored in the MFP is limited. When the number of image data of documents that can be stored is limited, the MFP may transmit created image data to an external system. The external system receives the image data transmitted by the MFP and stores the received image data. When taking out the image data stored in the external system, the user needs to find out the storage location (information indicating a storage area) and access the image data or needs to receive the Email transmitted by the MFP and access the URL transmitted to the received Email.

Embodiments provide an image forming apparatus that can reduce the efforts of taking out image data of a created document.

In general, according to one embodiment, there is provided an image forming apparatus including a processing unit (e.g., a processor), a creating unit (e.g., a code creator), and an output unit. The processing unit stores image data created by executing a job in a storage unit. The creating unit creates an information code representing information indicating a storage area of the storage unit in which the image data is stored. The output unit displays the information code created by the creating unit on a display unit.

Hereinafter, an image forming apparatus according to an embodiment will be described with reference to the accompanying drawings. The embodiment described below is merely an example, and the exemplary embodiment is not limited to the following embodiment.

In the drawings for illustrating the embodiment, the same reference numerals are used for those having the same functions, and repeated descriptions thereof are omitted.

FIG. 1 is a diagram illustrating a system configuration of an image forming system 1 of the embodiment. The image forming system 1 includes an image forming apparatus 100 and a server 400. In FIG. 1, a user terminal 300 is drawn in addition to the image forming apparatus 100 and the server 400.

The image forming apparatus 100, the user terminal 300, and the server 400 are communicably connected to each other via a network 500.

The image forming apparatus 100 is an apparatus that forms an image using a consumable item. The image forming apparatus 100 is, for example, a multifunction peripheral. The multifunction peripheral is an apparatus that has a plurality of functions. For example, the multifunction peripheral is an office apparatus having functions such as a printer, an image scanner, and a facsimile.

The image forming apparatus 100 scans a document to create image data in a file format related to an electronic document such as a portable document format (PDF).

The image forming apparatus 100 acquires, stores, and manages connection information for accessing the server 400. This connection information includes a uniform resource locator (URL), account information (e.g., device account), password information, and the like. That is, the connection information includes both information for logging in (signing in) to the server 400 and information for connecting to the server 400 so that data communication is possible while logged in (signed in).

The image forming apparatus 100 connects to the server 400 using the connection information stored and managed. The image forming apparatus 100 stores (uploads) the created image data in a storage destination folder of the server 400.

The server 400 is used by connecting to the network 500. The server 400 transmits URL notification information including the URL indicating the storage destination folder in which the image forming apparatus 100 stored the image data and a file name to the image forming apparatus 100.

The image forming apparatus 100 receives the URL notification information transmitted by the server 400. The image forming apparatus 100 acquires the URL included in the received URL notification information. The image forming apparatus 100 creates an information code of the acquired URL. The image forming apparatus 100 displays the created information code on a display.

The user terminal 300 includes an imaging unit. The imaging unit reads the information code displayed on the display of the image forming apparatus 100 and acquires the URL included in the read information code. The user terminal 300 uses the acquired URL to create an image data request for requesting image data to the server 400. The user terminal 300 transmits the created image data request to the server 400.

The server 400 receives the image data request transmitted by the user terminal 300. The server 400 creates a screen for providing image data based on the received image data request. The server 400 creates a screen data notification including screen data of the screen for providing the created image data and addressed to the user terminal 300. The server 400 transmits the created screen data notification to the user terminal 300.

The user terminal 300 receives the screen data notification transmitted by the server 400. The user terminal 300 displays the screen for providing the image data by processing the screen data included in the received screen data notification.

The user refers to the screen for providing the image data displayed on the user terminal 300 and designates the file name of the image data to perform an operation of acquiring the image data. The user terminal 300 creates an image data acquisition request addressed to the server 400 and including identification information such as a file name of image data, based on a user's operation. The user terminal 300 transmits the created image data acquisition request to the server 400.

The server 400 receives the image data acquisition request transmitted by the user terminal 300. The server 400 acquires image data corresponding to the file name included in the received image data acquisition request. The server 400 creates an image data acquisition response including the acquired image data and addressed to the user terminal 300. The server 400 transmits the created image data acquisition response to the user terminal 300.

The user terminal 300 receives the image data acquisition response transmitted by the server 400. The user terminal 300 acquires the image data included in the received image data acquisition response. The user terminal 300 displays the document by processing the acquired image data.

Hereinafter, each device will be described in detail.

Figure 2:
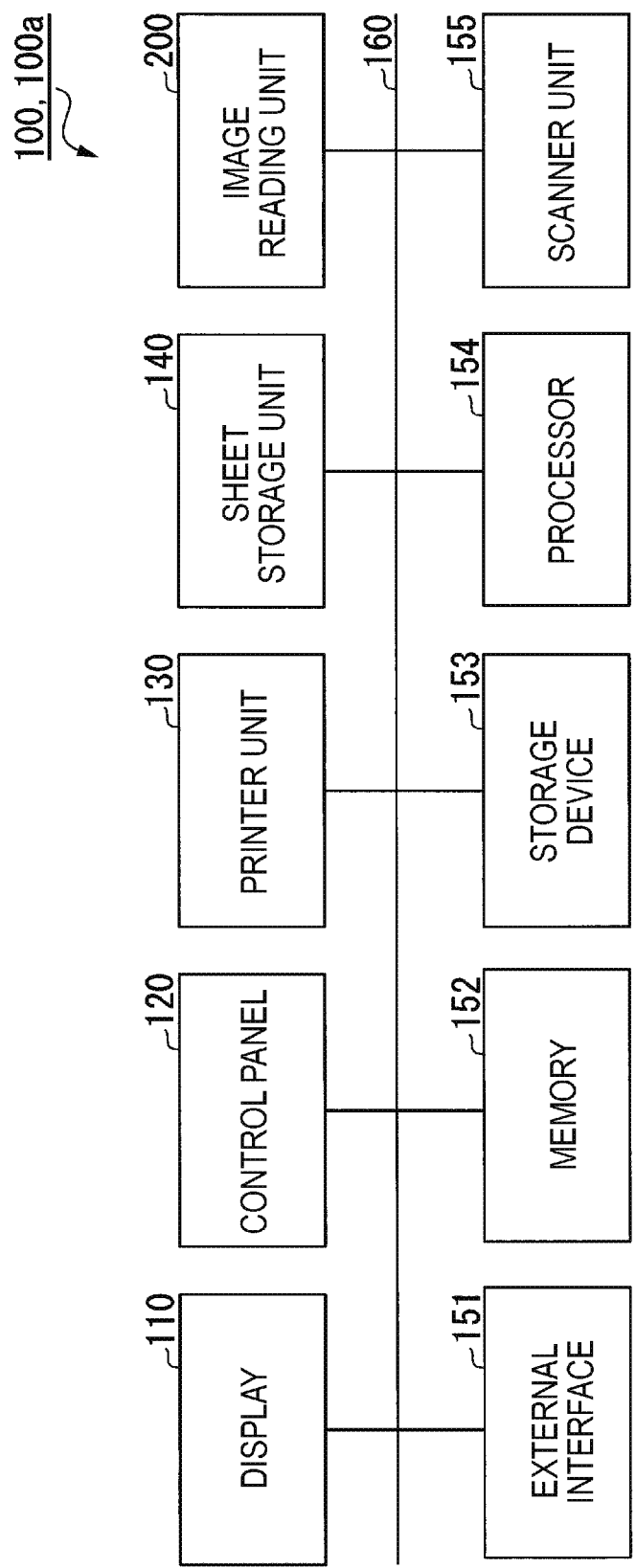
FIG. 2 is a block diagram illustrating a hardware configuration of an image forming apparatus according to the embodiment.

FIG. 2 is a block diagram illustrating a hardware configuration of the image forming apparatus 100 according to the embodiment. First, the image forming apparatus 100 will be described in detail with reference to FIGS. 1 and 2.

The image forming apparatus 100 forms an image on a sheet using a developer such as a toner or ink. When the developer is a toner, the developer is fixed on the sheet by being heated. When the developer is ink, an image is formed on the sheet by dropping the developer on the sheet. The sheet is, for example, paper or label paper. The sheet may be any material as long as the image forming apparatus 100 can form an image on the surface thereof. Examples of the toner include a decolorable toner, non-decolorable toner (normal toner), and decolorable toner. The developer is one specific example of a consumable item used in the image forming apparatus 100.

The image forming apparatus 100 includes a display 110, a control panel 120, a printer unit (printer) 130, a sheet storage unit 140, an external interface 151, a memory 152, a storage device 153, a processor 154, and a scanner unit (scanner) 155, and an image reading unit (image reader) 200. The printer unit 130 of the image forming apparatus 100 may be a device that fixes a toner image or an inkjet type device. The functional units are connected to each other via a system bus 160 so that data communication is possible.

The display 110 is an image display device (display) such as a liquid crystal display or an organic electro luminescence (EL) display. The display 110 displays various types of information for the image forming apparatus 100.

The control panel 120 includes a plurality of buttons. The control panel 120 receives user operations. The control panel 120 outputs a signal according to the operation performed by the user to the processor 154 of the image forming apparatus 100. The display 110 and the control panel 120 may be configured as an integrated touch panel.

The printer unit 130 forms an image on a sheet based on the image data generated by the image reading unit 200 or the image data received via a communication path. The printer unit 130 forms an image by the following processing, for example. The image forming unit of the printer unit 130 forms an electrostatic latent image on a photosensitive drum based on the image data. The image forming unit of the printer unit 130 forms a visible image by adhering the developer to the electrostatic latent image. The transfer unit of the printer unit 130 transfers the visible image onto a sheet. The fixing unit (fixing device) of the printer unit 130 fixes the visible image on the sheet by heating and pressurizing the sheet. The sheet on which the image is formed may be a sheet stored in the sheet storage unit 140 or may be the manually fed sheet.

The sheet storage unit 140 (such as a cassette) stores the sheet used for image formation in the printer unit 130.

The external interface 151 is configured using a communication interface. The external interface 151 communicates with other devices such as the server 400 and the user terminal 300 by wire or wirelessly via the network 500 according to a predetermined protocol. Specifically, the external interface 151 acquires image data output by the processor 154 and uploads the acquired image data to the server 400. The external interface 151 acquires the URL notification information transmitted by the server 400. The external interface 151 acquires access completion notification transmitted by the server 400.

The memory 152 temporarily stores data used by each functional unit included in the image forming apparatus 100. The memory 152 is, for example, a random access memory (RAM). The memory 152 stores data needed when the image forming apparatus 100 operates. The memory 152 may temporarily store digital data generated by the image reading unit 200. The memory 152 may temporarily store image data formed in the image forming apparatus 100.

The storage device 153 is configured using a storage device such as a magnetic hard disk device or a semiconductor memory device. The storage device 153 stores a software program and data needed when the image forming apparatus 100 operates.

The processor 154 controls the operation of each functional unit of the image forming apparatus 100. The processor 154 loads the software program stored in the storage device 153 onto the memory 152 and executes the loaded software program to execute processing. The processor 154 acquires the image data output by the scanner unit 155, stores the acquired image data in the memory 152, outputs the image data to the printer unit 130, and transmits the image data to other devices via the external interface 151.

The scanner unit 155 reads images such as characters, figures, and photographs drawn on a sheet placed at a predetermined position. The scanner unit 155 includes an imaging element. For the scanner unit 155, a charge-coupled device (CCD) system, a contact image sensor (CIS) system, or another system may be adopted. The scanner unit 155 generates image data based on the read image. The scanner unit 155 outputs the generated image data to the processor 154.

The image reading unit (reader) 200 reads an image to be read as brightness and darkness of light. The image reading unit 200 records image data obtained by reading. The recorded image data may be uploaded to the server 400 via the network 500. An image of the recorded image data may be formed on the sheet by the printer unit 130.

Figure 3:
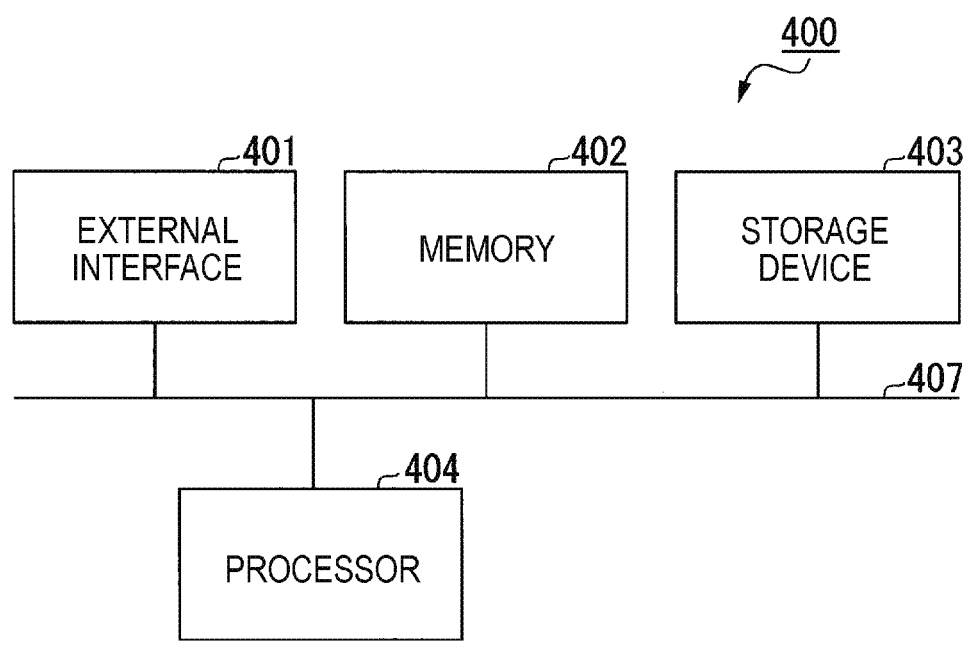
FIG. 3 is a block diagram illustrating a hardware configuration of a server according to the embodiment.

FIG. 3 is a block diagram illustrating a hardware configuration of the server 400 of the embodiment. The server 400 includes an external interface 401, a memory 402, a storage device 403, and a processor 404. The functional units are connected to each other via a system bus 407 so that data communication is possible.

The external interface 401 is configured using a communication interface. The external interface 401 communicates with other devices such as the image forming apparatus 100 and the user terminal 300 via the network 500 according to a predetermined protocol. Specifically, the external interface 401 acquires image data uploaded by the image forming apparatus 100 and outputs the acquired image data to the processor 404. The external interface 401 acquires the URL notification information output by the processor 404 and transmits the acquired URL notification information to the user terminal 300. The external interface 401 acquires the image data request transmitted by the user terminal 300 and outputs the acquired image data request to the processor 404.

The external interface 401 acquires the screen data notification output by the processor 404 and transmits the acquired screen data notification to the user terminal 300. The external interface 401 acquires the image data acquisition request transmitted by the user terminal 300 and outputs the acquired image data acquisition request to the processor 404. The external interface 401 acquires the image data acquisition response output by the processor 404 and transmits the acquired image data acquisition response to the user terminal 300. The external interface 401 acquires the access completion notification output by the processor 404 and transmits the acquired access completion notification to the image forming apparatus 100.

The memory 402 temporarily stores data used by each functional unit included in the server 400. The memory 402 is, for example, a RAM. The memory 402 stores data needed when the server 400 operates.

The storage device 403 is configured using a storage device such as a magnetic hard disk device or a semiconductor memory device. The storage device 403 stores a software program and data needed when the server 400 operates.

The processor 404 controls the operation of each functional unit of the server 400. The processor 404 loads the software program stored in the storage device 403 onto the memory 402 and executes the loaded software program to execute processing.

Figure 4:
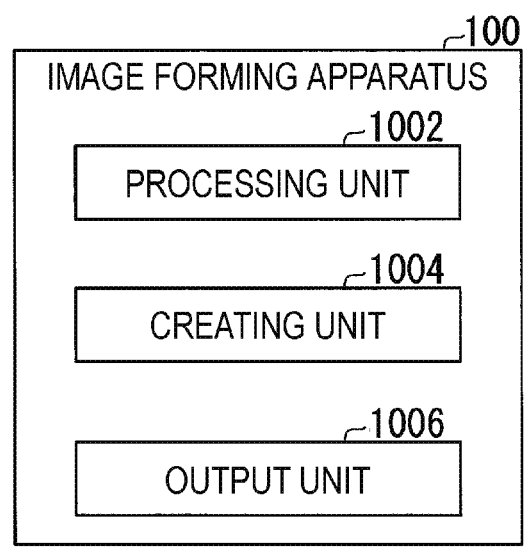
FIG. 4 is a diagram illustrating an example of a software configuration of the image forming apparatus.

FIG. 4 is a diagram illustrating an example of a software configuration of the image forming apparatus 100 of the embodiment. The software configuration illustrated in FIG. 4 is realized by the processor 154 of the image forming apparatus 100 processing the software program stored in the storage device 153 of the image forming apparatus 100.

The processor 154 of the image forming apparatus 100 functions as a processing unit 1002, a creating unit 1004, and an output unit 1006.

The processing unit 1002 causes the scanner unit 155 to execute a scan job or the printer unit 130 to execute a print job based on an operation performed by the user on the control panel 120. The processing unit 1002 acquires image data of a document created by the scanner unit 155 by executing the scan job. The processing unit 1002 uploads the acquired image data to a storage device such as the server 400.

The processing unit 1002 acquires, for the uploaded image data, information indicating a storage area in which the image data is stored, such as a URL included in the URL notification information transmitted by the server 400 and acquired by the external interface 151. Here, the description will be continued regarding a case where a URL is applied as an example of the information indicating a storage area in which image data is stored. The storage destination folder in which the uploaded image data is stored and the file name may be indicated by the URL. Hereinafter, as an example, the description of the case where the storage destination folder in which the uploaded image data is stored and the filename are indicated by the URL will be continued.

The creating unit 1004 creates a two-dimensional information code such as a QR code (registered trademark) or a one-dimensional information code such as a barcode representing the URL acquired by the processing unit 1002. Here, the description of the case where the creating unit 1004 creates the two-dimensional information code representing the URL will be continued.

The output unit 1006 acquires the two-dimensional information code created by the creating unit 1004. The output unit 1006 outputs the acquired two-dimensional information code to the display 110.

The display 110 acquires the two-dimensional information code output by the output unit 1006 and displays the acquired two-dimensional information code.

The output unit 1006 acquires the access completion notification transmitted by the server 400 and acquired by the external interface 151. The output unit 1006 acquires information indicating the filename included in the acquired access completion notification. The output unit 1006 stops outputting the two-dimensional information code corresponding to the acquired file name.

Figure 5:
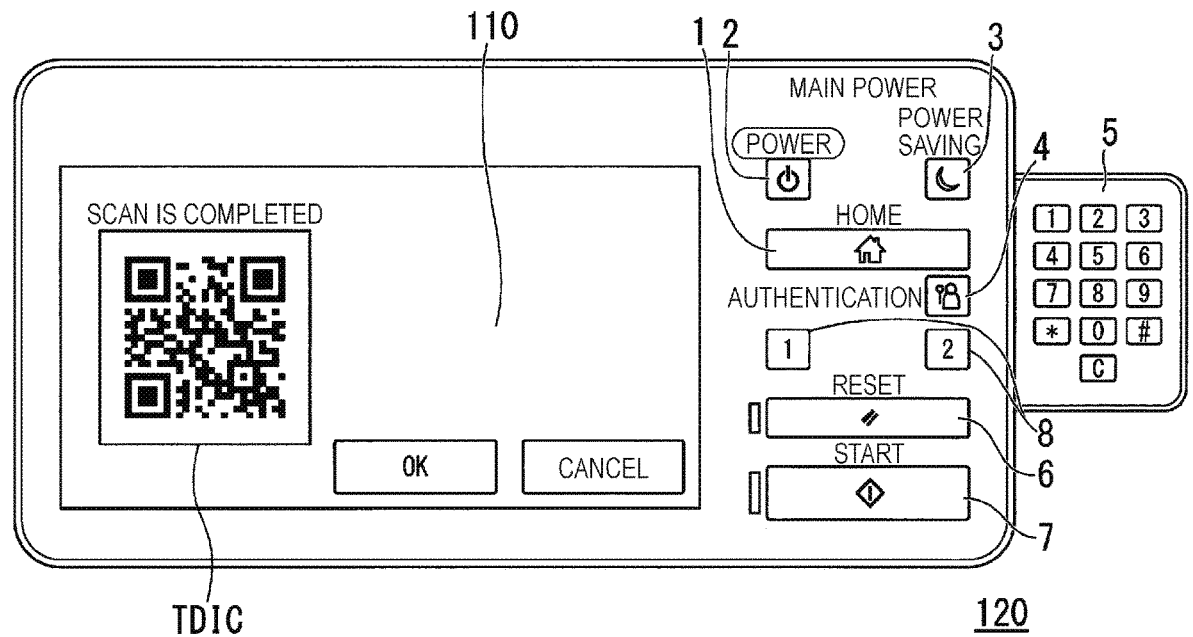
FIG. 5 is a diagram illustrating an example of a display of the image forming apparatus.

FIG. 5 is a diagram illustrating an example of the display 110 of the image forming apparatus 100 of this embodiment. In FIG. 5, the control panel 120 is also illustrated in addition to the display.

The display 110 is configured by, for example, a touch panel. A two-dimensional information code TDIC, an OK button, and a cancel button are displayed on the display 110.

The control panel 120 includes a home button 1, a power button 2, a power saving button 3, an authentication button 4, a numeric keypad 5, a reset button 6, a start button 7, and a function button 8.

The home button 1 is pressed when a home screen is displayed on the display 110. The power button 2 is pressed when the power of the image forming apparatus 100 is turned on or off. The power saving button 3 is pressed when shifting the image forming apparatus 100 from a normal mode to a power saving mode or restoring the power saving mode to the normal mode.

The authentication button 4 is pressed when logging in to the image forming apparatus 100. An authentication screen is displayed on the display 110 when the user presses the authentication button 4. The authentication screen includes a box for inputting a user ID and a box for inputting a password. The user inputs the user ID in the box for inputting the user ID and the password in the box for inputting the password by using the numeric keypad 5 described later. The control panel 120 outputs the combination of the user ID and the password input by the user to the processing unit 1002. The processing unit 1002 authenticates the user based on the combination of the user ID and the password output by the control panel 120 and outputs the authentication result to the control panel 120.

The numeric keypad 5 is pressed when inputting numbers and the like. The reset button 6 is pressed when releasing all the selected functions and restoring to the initial settings. The start button 7 is pressed when starting an operation such as copying. For the function button 8, a frequently used function is registered. The function button 8 is pressed when calling the registered function.

Figure 6:
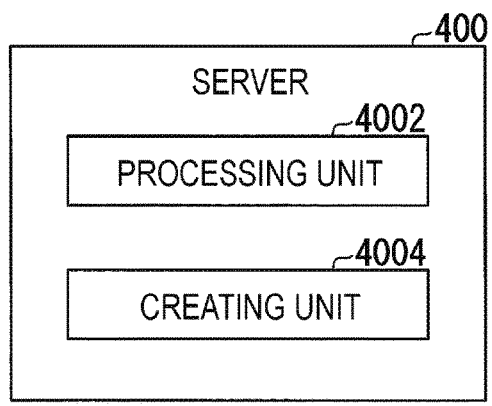
FIG. 6 is a diagram illustrating an example of a software configuration of the server.

FIG. 6 is a diagram illustrating an example of a software configuration of the server 400 of the embodiment. The software configuration illustrated in FIG. 6 is realized by the processor 404 of the server 400 processing a program stored in the storage device 403 of the server 400.

The processor 404 of the server 400 functions as a processing unit 4002 and a creating unit 4004.

The processing unit 4002 acquires the image data, which is uploaded by the image forming apparatus 100, from the external interface 401. The processing unit 4002 stores the acquired image data in the storage device 403.

In the creating unit 4004, the processing unit 4002 acquires information indicating the storage area of the storage device 403 in which image data is stored. For example, the creating unit 4004 acquires a URL, which indicates a storage destination folder of image data and a file name, as the information indicating the storage area. The creating unit 4004 creates URL notification information including the acquired URL and addressed to the image forming apparatus 100. The creating unit 4004 outputs the created URL notification information to the external interface 401.

The processing unit 4002 acquires an image data request from the external interface 401. The processing unit 4002 acquires image data from the storage device 403 based on the URL designated in the acquired image data request. The processing unit 4002 creates screen data for providing the acquired image data.

The creating unit 4004 acquires the screen data created by the processing unit 4002. The creating unit 4004 creates a screen data notification including the acquired screen data and addressed to the user terminal 300 that transmitted the image data request. The creating unit 4004 outputs the created screen data notification to the external interface 401.

The processing unit 4002 acquires an image data acquisition request from the external interface 401. The processing unit 4002 acquires the corresponding image data from the storage device 403 based on the storage destination folder and the file name designated by the acquired image data acquisition request.

The creating unit 4004 acquires the image data acquired by the processing unit 4002. The creating unit 4004 creates an image data acquisition response including the acquired image data and addressed to the user terminal 300 that transmitted the image data acquisition request. The creating unit 4004 outputs the created image data acquisition response to the external interface 401.

The creating unit 4004 creates an access completion notification that includes information for notifying the image forming apparatus 100 that the image data is acquired by the user terminal 300 and the file name of the image data and that is addressed to the image forming apparatus 100 that transmitted the image data. The creating unit 4004 outputs the created access completion notification to the external interface 401.

The user terminal 300 is, for example, a smartphone, a tablet terminal, a personal computer, or the like. The user terminal 300 includes the imaging unit. In the user terminal 300, an application program for using the image forming system 1 is activated to support the image forming system described above. It is assumed that an example of the user terminal 300 is a smartphone and an application program (image forming system utilization application) is running. The image forming system utilization application causes the user terminal 300 to read the two-dimensional information code displayed on the display 110 of the image forming apparatus 100 by using the imaging unit according to the user operation and to access the server 400 based on the read two-dimensional information code. The image forming system utilization application causes the user terminal 300 to acquire image data corresponding to the two-dimensional information code from the accessed server 400.

Operation of Image Forming System

Figure 7:
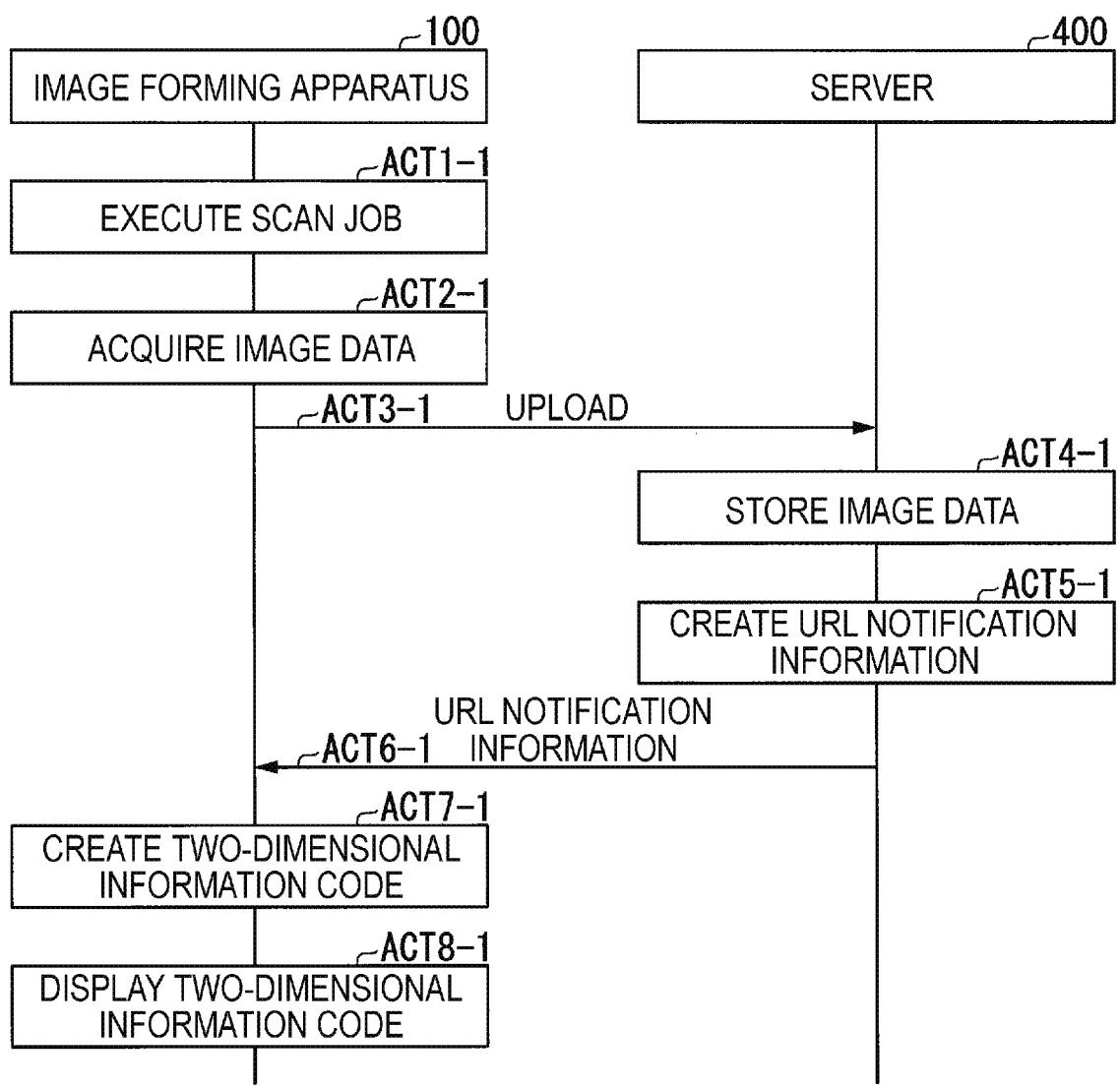
FIG. 7 is a sequence chart illustrating an Example 1 of a flow of processing of the image forming system.

FIG. 7 is a sequence chart illustrating Example 1 of the operation of the image forming system of the embodiment. In the example illustrated in FIG. 7, a case where the image forming apparatus 100 executes a scan job based on an operation performed by the user on the control panel 120 will be described.

In the image forming apparatus 100, the processing unit 1002 causes the scanner unit 155 to execute a scan job based on an operation performed by the user on the control panel 120 (ACT 1-1).

In the image forming apparatus 100, the processing unit 1002 acquires the image data created by the scanner unit 155 by causing the scan job to be executed (ACT 2-1).

In the image forming apparatus 100, the processing unit 1002 outputs the acquired image data to the external interface 151. The external interface 151 acquires the image data output by the processing unit 1002 and uploads the acquired image data to the server 400 (ACT 3-1).

In the server 400, the external interface 401 acquires the image data transmitted by the image forming apparatus 100. The processing unit 4002 acquires the image data uploaded by the image forming apparatus 100 from the external interface 401. The processing unit 4002 stores the acquired image data in the storage device 403 (ACT 4-1).

In the server 400, the creating unit 4004 acquires the URL indicating the storage destination folder of the image data stored in the storage device 403 by the processing unit 4002 and the file name. The creating unit 4004 creates URL notification information including the acquired URL and addressed to the image forming apparatus 100 (ACT 5-1).

In the server 400, the creating unit 4004 outputs the created URL notification information to the external interface 401. The external interface 401 acquires the URL notification information output by the creating unit 4004 and transmits the acquired URL notification information to the user terminal 300 (ACT 6-1).

In the image forming apparatus 100, the external interface 151 acquires the URL notification information transmitted by the server 400.

In the image forming apparatus 100, the processing unit 1002 acquires the URL notification information acquired by the external interface 151. The creating unit 1004 creates a two-dimensional information code representing the URL based on the URL acquired by the processing unit 1002 (ACT 7-1).

In the image forming apparatus 100, the output unit 1006 acquires the two-dimensional information code created by the creating unit 1004. The output unit 1006 outputs the acquired two-dimensional information code to the display 110. The display 110 acquires the two-dimensional information code output by the output unit 1006 and displays the acquired two-dimensional information code (ACT 8-1).

Figure 8:
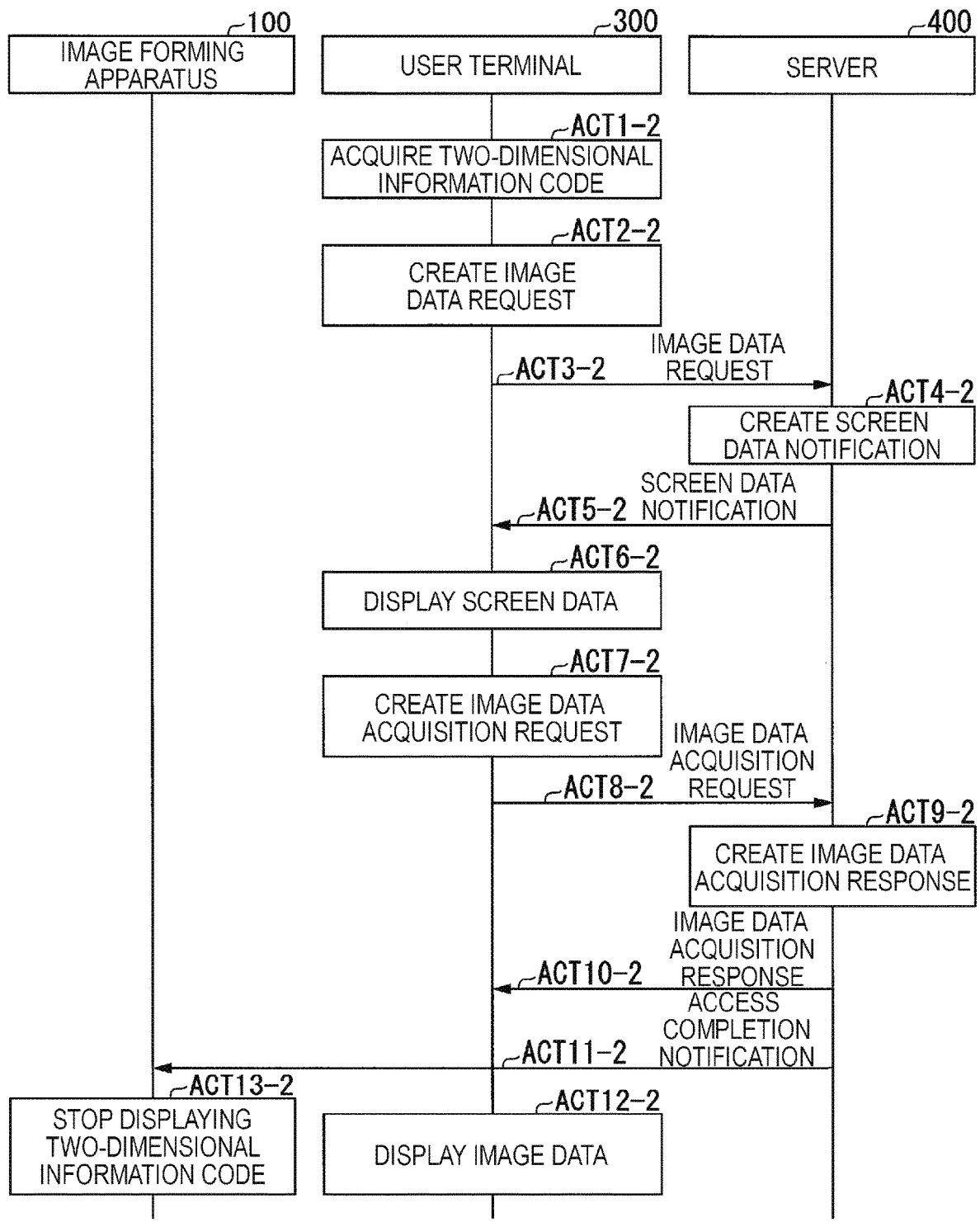
FIG. 8 is a sequence chart illustrating an Example 2 of the flow of processing of the image forming system.

FIG. 8 is a sequence chart illustrating Example 2 of the operation of the image forming system of the embodiment. FIG. 8 illustrates an operation after the operation illustrated in FIG. 7.

The user terminal 300 acquires the two-dimensional information code displayed on the display 110 of the image forming apparatus 100 by reading the two-dimensional information code (ACT 1-2).

The user terminal 300 uses the acquired two-dimensional information code to create an image data request for requesting image data (ACT 2-2). For example, the user terminal 300 uses the URL indicated by the two-dimensional information code to create an image data request for requesting image data.

The user terminal 300 transmits the created image data request to the server 400 (ACT 3-2).

In the server 400, the external interface 401 acquires the image data request transmitted by the user terminal 300. The processing unit 4002 acquires the image data request from the external interface 401. The processing unit 4002 acquires accessible image data by using the storage destination folder and the filename indicated by the URL designated in the acquired image data request. The processing unit 4002 creates screen data for providing the acquired image data. The creating unit 4004 acquires the screen data created by the processing unit 4002. The creating unit 4004 creates a screen data notification including the acquired screen data and addressed to the user terminal 300 that transmitted the image data request (ACT 4-2).

In the server 400, the creating unit 4004 outputs the created screen data notification to the external interface 401. The external interface 401 acquires the screen data notification output by the creating unit 4004 and transmits the acquired screen data notification to the user terminal 300 (ACT 5-2).

The user terminal 300 receives the screen data notification transmitted by the server 400. The user terminal 300 acquires the screen data included in the received screen data notification. The user terminal 300 displays the acquired screen data by processing the acquired screen data (ACT 6-2).

The user terminal 300 creates an image data acquisition request including the information indicating the file name of the selected image data and addressed to the server 400 by the user performing an operation for selecting image data to be acquired on the displayed screen (ACT 7-2).

The user terminal 300 transmits the created image data acquisition request to the server 400 (ACT 8-2).

In the server 400, the external interface 401 acquires the image data acquisition request transmitted by the user terminal 300. The processing unit 4002 acquires the image data acquisition request acquired by the external interface 401. The processing unit 4002 acquires the corresponding image data from the storage device 403 using the file name of the image data designated by the acquired image data acquisition request.

The creating unit 4004 acquires the image data acquired by the processing unit 4002. The creating unit 4004 creates an image data acquisition response including the acquired image data and addressed to the user terminal 300 that transmitted the image data acquisition request (ACT 9-2).

In the server 400, the creating unit 4004 outputs the created image data acquisition response to the external interface 401. The external interface 401 acquires the image data acquisition response output by the creating unit 4004 and transmits the acquired image data acquisition response to the user terminal 300 (ACT 10-2).

In the server 400, the creating unit 4004 creates an access completion notification including the file name of the image data and addressed to the image forming apparatus 100, after outputting the image data acquisition response to the external interface 401. The creating unit 4004 outputs the created access completion notification to the external interface 401. The external interface 401 acquires the access completion notification output by the creating unit 4004 and transmits the acquired access completion notification to the image forming apparatus 100 (ACT 11-2).

The user terminal 300 receives the image data acquisition response transmitted by the server 400. The user terminal 300 acquires the image data included in the received image data acquisition response. The user terminal 300 displays the acquired image data by processing the acquired image data (ACT 12-2).

In the image forming apparatus 100, the external interface 151 acquires the access completion notification transmitted by the server 400. The output unit 1006 acquires the access completion notification acquired by the external interface 151. The output unit 1006 acquires information indicating the filename included in the acquired access completion notification. The output unit 1006 stops outputting the two-dimensional information code corresponding to the acquired file name.

In the embodiment described above, although the case where the application program for using the image forming system 1 is installed in the user terminal 300 is described, but the present disclosure is not limited to this example. For example, a web browser may be installed in the user terminal 300. In this case, the user terminal 300 supports the image forming system described above by activating the web browser. The user terminal 300 causes the imaging unit to read the two-dimensional information code displayed on the display 110 of the image forming apparatus 100 according to the user operation. The user terminal 300 accesses the server 400 by operating the web browser based on the two-dimensional information code read by the imaging unit. The user terminal 300 acquires a file corresponding to the two-dimensional information code from the accessed server 400 by operating the web browser.

In the embodiment described above, the creating unit 1004 of the image forming apparatus 100 may create a temporarily usable two-dimensional information code based on the URL acquired by the processing unit 1002 or may create a temporary two-dimensional information code.

In the embodiment described above, when the output unit 1006 of the image forming apparatus 100 can acquire the access completion notification within a certain period of time after outputting the two-dimensional information code to the display 110, the server 400 may continue to store the image data corresponding to the file name included in the access completion notification.

On the other hand, when the output unit 1006 of the image forming apparatus 100 cannot acquire the access completion notification even after a certain period of time elapsed since the two-dimensional information code was output to the display 110, the server 400 may delete the image data corresponding to the file name indicated in the URL that is a source of the two-dimensional information code. In this case, the image forming apparatus 100 may transmit a deletion request, that includes the corresponding file name, and that is addressed to the server 400, to the server 400. The server 400 receives the deletion request transmitted by the image forming apparatus 100 and deletes image data corresponding to the file name included in the received deletion request.

When the user performs an operation to delete the two-dimensional information code which was output by the output unit 1006 of the image forming apparatus 100 to the display 110 and displayed on the display 110, the server 400 may delete the image data corresponding to the file name indicated by the URL represented by the two-dimensional information code. In this case, the image forming apparatus 100 transmits a deletion request, that includes the file name indicated by the URL represented by the two-dimensional information code and that is addressed to the server 400, to the server 400. The server 400 receives the deletion request transmitted by the image forming apparatus 100 and deletes the image data corresponding to the file name included in the received deletion request.

Even when communication between the user terminal 300 and the server 400 is interrupted, the server 400 may delete the image data corresponding to the file name included in the image data acquisition request. For example, when communication is interrupted while the image data acquisition response is being transmitted from the server 400 to the user terminal 300, the server 400 deletes the image data corresponding to the file name included in the image data acquisition request.

The server 400 may delete the image data included in the image data acquisition response from the storage device 403 after transmitting the image data acquisition response to the user terminal 300.

According to the image forming system 1 of this embodiment, the image forming apparatus 100 includes the processing unit 1002 that stores the image data created by executing the job in an external device such as the storage device 403 of the server 400 as a storage unit, the creating unit 1004 that creates an information code representing information indicating the storage area of the external device in which image data is stored, and the output unit 1006 that displays the information code created by the creating unit 1004 on the display 110 as a display unit. With this configuration, the user terminal 300 can take in (acquire) image data from an external device such as the server 400 by reading the information code displayed on the display 110, and thus, it is possible to reduce the effort of taking out (acquiring) the image data created by the image forming apparatus 100.

The creating unit 1004 creates a two-dimensional information code representing information indicating the storage area of the external device in which the image data is stored. With this configuration, a two-dimensional information code such as a QR code can be created.

The user terminal 300 may display the image with the web browser by reading the information code. With this configuration, the image can be acquired using the web browser.

The user terminal 300 may display an image when the information code is read by operating an application being activated. With this configuration, the image can be acquired using the application.

When the image data is accessed by the user terminal 300, the output unit 1006 stops displaying the information code on the display unit. With this configuration, the time for displaying the information code can be shortened, and thus the security can be ensured.

Modification

FIG. 1 can be applied to the configuration example of an image forming system 1a of a modification of the embodiment. As compared with the image forming system 1 of the embodiment, the image forming system 1a includes an image forming apparatus 100a instead of the image forming apparatus 100 and the server 400 is omitted. The image forming apparatus 100a and the user terminal 300 are communicably connected to each other via the network 500.

The image forming apparatus 100a is an apparatus that forms an image using a consumable item. The image forming apparatus 100a is, for example, a multifunction peripheral.

The image forming apparatus 100a scans a document to create image data in a file format for an electronic document. The image forming apparatus 100a stores the created image data.

The image forming apparatus 100a acquires operation information for selecting image data by the user performing an operation of selecting image data to be taken into the user terminal 300. The image forming apparatus 100a acquires a URL indicating the storage destination folder in which the selected document is stored and the file name based on the acquired operation information. The image forming apparatus 100a creates a two-dimensional information code representing the acquired URL. The image forming apparatus 100a displays the created two-dimensional information code on the display.

The user terminal 300 reads the two-dimensional information code displayed on the display of the image forming apparatus 100a and acquires the URL included in the read two-dimensional information code. The user terminal 300 uses the acquired URL to create an image data request for requesting image data to the image forming apparatus 100a. The user terminal 300 transmits the created image data request to the image forming apparatus 100a.

The image forming apparatus 100a receives the image data request transmitted by the user terminal 300. The image forming apparatus 100a creates a screen for providing the image data based on the received image data request. The image forming apparatus 100a creates a screen data notification including the screen data of the created screen and addressed to the user terminal 300. The image forming apparatus 100a transmits the created screen data notification to the user terminal 300.

The user terminal 300 receives the screen data notification transmitted by the image forming apparatus 100a. The user terminal 300 displays the screen by processing the screen data included in the received screen data notification.

The user refers to the screen displayed on the user terminal 300 and designates the file name of the document to perform the operation of acquiring the document. The user terminal 300 creates an image data acquisition request including identification information such as a designated file name of the document and addressed to the server 400, based on the user operation. The user terminal 300 transmits the created image data acquisition request to the image forming apparatus 100a.

The image forming apparatus 100a receives the image data acquisition request transmitted by the user terminal 300. The image forming apparatus 100a acquires image data corresponding to the file name of the document included in the received image data acquisition request. The image forming apparatus 100a creates an image data acquisition response including the acquired image data and addressed to the user terminal 300. The image forming apparatus 100a transmits the created image data acquisition response to the user terminal 300.

The user terminal 300 receives the image data acquisition response transmitted by the image forming apparatus 100a. The user terminal 300 acquires the image data included in the received image data acquisition response. The user terminal 300 displays the document by processing the acquired image data.

Hereinafter, the image forming apparatus 100a different from the embodiment will be described in detail.

FIG. 2 can be applied to a hardware block diagram of the image forming apparatus 100a according to the modification of the embodiment.

Figure 9:
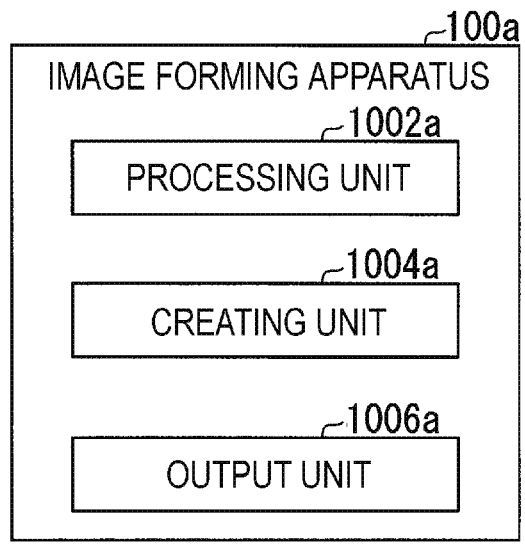
FIG. 9 is a functional block diagram of an image forming apparatus of a modification according to the embodiment.

FIG. 9 is a diagram illustrating an example of a software configuration of the image forming apparatus 100a of the modification of the embodiment. The software configuration illustrated in FIG. 9 is realized by the processor 154 of the image forming apparatus 100a processing the software program stored in the storage device 153 of the image forming apparatus 100a.

The processor 154 of the image forming apparatus 100a functions as a processing unit 1002a, a creating unit 1004a, and an output unit 1006a.

The processing unit 1002a causes the scanner unit 155 to execute a scan job or the printer unit 130 to execute a print job based on an operation performed by the user on the control panel 120. The processing unit 1002a acquires image data created by the scanner unit 155 by executing the scan job. The processing unit 1002a stores the acquired image data in the storage device 153.

The processing unit 1002a acquires operation information for selecting the document by the user performing an operation for selecting image data to be taken into the user terminal 300 on the control panel 120. The processing unit 1002a acquires the URL indicating the storage destination folder in which the selected image data is stored and the file name based on the acquired operation information.

The creating unit 1004a creates a two-dimensional information code such as a QR code and a one-dimensional information code such as a barcode representing the URL acquired by the processing unit 1002a. Here, the description of a case where the creating unit 1004a creates a two-dimensional information code representing the URL will be continued.

The output unit 1006a acquires the two-dimensional information code created by the creating unit 1004a. The output unit 1006a outputs the acquired two-dimensional information code to the display 110.

The display 110 acquires the two-dimensional information code output by the output unit 1006a and displays the acquired two-dimensional information code.

The processing unit 1002a acquires an image data request from the external interface 401. The processing unit 1002a acquires image data accessible by the URL based on the URL designated in the acquired image data request. The processing unit 1002a creates screen data for providing the acquired image data.

The creating unit 1004a acquires the screen data created by the processing unit 1002a. The creating unit 1004a creates a screen data notification including the acquired screen data and addressed to the user terminal 300 that transmitted the image data request. The creating unit 1004a outputs the created screen data notification to the external interface 401.

The processing unit 1002a acquires an image data acquisition request from the external interface 401. The processing unit 1002a acquires the corresponding image data from the storage device 153 based on the storage destination folder designated by the acquired image data acquisition request and the file name.

The creating unit 1004a acquires the image data acquired by the processing unit 1002a. The creating unit 1004a creates an image data acquisition response including the acquired image data and addressed to the user terminal 300 that transmitted the image data acquisition request. The creating unit 1004a outputs the created image data acquisition response to the external interface 401.

After the creating unit 1004a outputs the image data acquisition response to the external interface 401, the output unit 1006a stops outputting the two-dimensional information code corresponding to the file name of the image data included in the image data acquisition response.

(Operation of Image Forming System)

Figure 10:
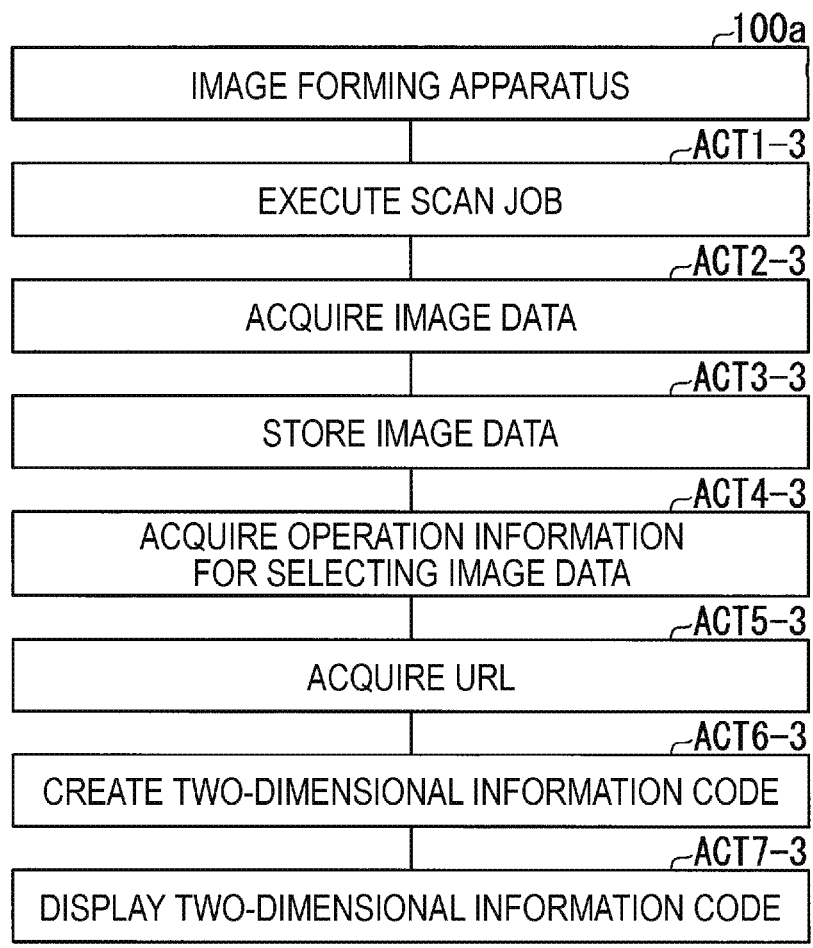
FIG. 10 is a sequence chart illustrating Example 1 of a flow of processing of an image forming system of the modification.

FIG. 10 is a sequence chart illustrating Example 1 of a flow of processing of the image forming system 1a according to the modification of the embodiment. In the example illustrated in FIG. 10, a case where the image forming apparatus 100a executes a scan job based on an operation performed by the user on the control panel 120 will be described.

In the image forming apparatus 100a, the processing unit 1002a causes the scanner unit 155 to execute a scan job based on an operation performed by the user on the control panel 120 (ACT 1-3).

In the image forming apparatus 100a, the processing unit 1002a acquires the image data created by the scanner unit 155 by executing the scan job (ACT 2-3).

In the image forming apparatus 100a, the processing unit 1002a acquires the image data of the document created by the scanner unit 155 by executing the scan job. The processing unit 1002a stores the acquired image data in the storage device 153 (ACT 3-3).

In the image forming apparatus 100a, the processing unit 1002a acquires operation information for selecting image data by the user performing an operation for selecting the image data to be taken into the user terminal 300 on the control panel 120 (ACT 4-3).

In the image forming apparatus 100a, the processing unit 1002a acquires the URL indicating the storage destination folder in which the selected image data is stored and the file name, based on the acquired operation information (ACT 5-3).

In the image forming apparatus 100a, the creating unit 1004a creates a two-dimensional information code such as a QR code or a one-dimensional information code such as a barcode representing the URL, based on the URL acquired by the processing unit 1002a (ACT 6-3).

In the image forming apparatus 100a, the output unit 1006a acquires the two-dimensional information code created by the creating unit 1004a. The output unit 1006a outputs the acquired two-dimensional information code to the display 110.

The display 110 acquires the two-dimensional information code output by the output unit 1006a and displays the acquired two-dimensional information code (ACT 7-3).

Figure 11:
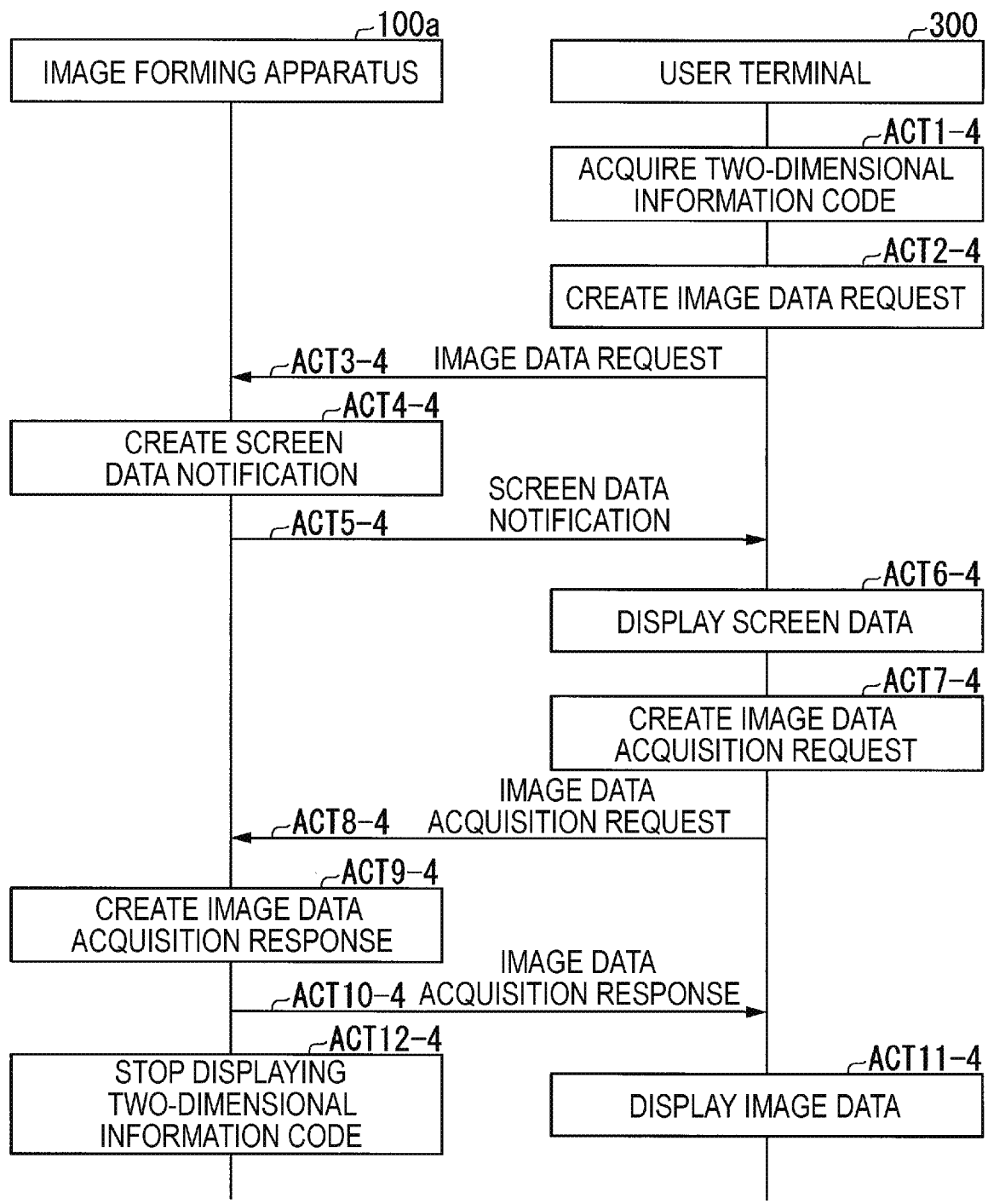
FIG. 11 is a sequence chart illustrating Example 2 of the flow of the processing flow of the image forming system.

FIG. 11 is a sequence chart illustrating Example 2 of the flow of the processing of the image forming system 1a according to the modification of the embodiment. FIG. 11 illustrates an operation after the operation illustrated in FIG. 10.

The user terminal 300 acquires the two-dimensional information code displayed on the display 110 of the image forming apparatus 100 by reading the two-dimensional information code (ACT 1-4).

The user terminal 300 uses the acquired two-dimensional information code to create an image data request for requesting image data (ACT 2-4). For example, the user terminal 300 uses the URL indicated by the two-dimensional information code to create an image data request for requesting image data.

The user terminal 300 transmits the created image data request to the image forming apparatus 100a (ACT 3-4).

In the image forming apparatus 100a, the processing unit 1002a acquires the image data request from the external interface 401. The processing unit 1002a acquires accessible image data by using the storage destination folder and the file name indicated by the URL designated by the acquired image data request. The processing unit 1002a creates screen data for providing the acquired image data. The creating unit 1004a acquires the screen data created by the processing unit 1002a. The creating unit 1004a creates a screen data notification including the acquired screen data and addressed to the user terminal 300 that transmitted the image data request (ACT 4-4).

In the image forming apparatus 100a, the creating unit 1004a outputs the created screen data notification to the external interface 401. The external interface 401 acquires the screen data notification output by the creating unit 1004a and transmits the acquired screen data notification to the user terminal 300 (ACT 5-4).

The user terminal 300 receives the screen data notification transmitted by the image forming apparatus 100a. The user terminal 300 acquires the screen data included in the received screen data notification. The user terminal 300 displays the acquired screen data by processing the acquired screen data (ACT 6-4).

The user terminal 300 creates an image data acquisition request that includes the information indicating the file name of the selected image data and that is addressed to the image forming apparatus 100a by performing an operation for the user selecting image data to be acquired on the displayed screen (ACT 7-4).

The user terminal 300 transmits the created image data acquisition request to the image forming apparatus 100a (ACT 8-4).

In the image forming apparatus 100a, the processing unit 1002a acquires the image data acquisition request from the external interface 401. The processing unit 1002a acquires the corresponding image data from the storage device 153 using the file name of the image data designated by the acquired image data acquisition request.

The creating unit 1004a acquires the image data acquired by the processing unit 1002a. The creating unit 1004a creates an image data acquisition response including the acquired image data and addressed to the user terminal 300 that transmitted the image data acquisition request (ACT 9-4).

In the image forming apparatus 100a, the creating unit 1004a outputs the created image data acquisition response to the external interface 401. The external interface 401 acquires the image data acquisition response output by the creating unit 1004a and transmits the acquired image data acquisition response to the user terminal 300 (ACT 10-4).

The user terminal 300 receives the image data acquisition response transmitted by the image forming apparatus 100a. The user terminal 300 acquires the image data included in the received image data acquisition response. The user terminal 300 displays the acquired image data by processing the acquired image data (ACT 11-4).

In the image forming apparatus 100, the output unit 1006 stops outputting the two-dimensional information code corresponding to the image data included in the image data acquisition response (ACT 12-4).

In the modification of the embodiment described above, although the case where the image forming apparatus 100a acquires the operation information for selecting the image data by the user performing the operation for selecting the image data to be taken into the user terminal 300 among the image data stored and managed in the image forming apparatus 100a is described, but the present disclosure is not limited thereto.

For example, the user terminal 300 creates the operation information for selecting the image data by the user performing the operation of selecting image data to be taken into the user terminal 300 among the image data stored and managed in the image forming apparatus 100a. The user terminal 300 may transmit the created operation information to the image forming apparatus 100a. In this case, the image forming apparatus 100a operates based on the operation information transmitted by the user terminal 300.

According to the image forming system 1a of the modification of the embodiment, the image forming apparatus 100a acquires the operation information for selecting the image data by the user performing the operation for selecting the image data to be taken into the user terminal 300 among the image data stored and managed in the image forming apparatus 100a. The image forming apparatus 100a acquires the URL indicating the storage destination folder in which the selected image data is stored and the filename based on the acquired operation information. The image forming apparatus 100a creates a two-dimensional information code of the acquired URL. The image forming apparatus 100a displays the created two-dimensional information code on the display 110. With this configuration, the user terminal 300 can take in the image data from the image forming apparatus 100a by reading the information code displayed on the display 110, and thus it is possible to reduce the effort of taking out the image data created by the image forming apparatus 100.

While certain embodiments have been described, these embodiments have been presented by way of example only, and are not intended to limit the scope of the inventions. Indeed, the novel embodiments described herein may be embodied in a variety of other forms: furthermore various omissions, substitutions, and changes in the form of the embodiments described herein may be made without departing from the spirit of the inventions. The accompanying claims and their equivalents are intended to cover such forms or modifications as would fall within the scope and spirit of the invention. For example, the embodiment and the modification of the embodiment described above are applicable not only to the case where the user terminal 300 acquires the image data obtained by scanning but also to the case of printing on paper or the like.

Although the exemplary embodiment is described in detail as above with reference to the drawings, the specific configuration is not limited to this embodiment and includes design changes and the like in a range without departing from the gist of the exemplary embodiment.

For example, a computer program for realizing the functions of each device described above may be recorded in a computer-readable recording medium, and the program recorded in this recording medium may be read and executed by a computer system. The "computer system" referred to here may include an OS and hardware such as peripheral devices.

The "computer-readable recording medium" refers to a writable non-volatile memory such as a flexible disk, a magneto-optical disk, a ROM, a flash memory, or the like, a portable medium such as a digital versatile disc (DVD), and a storage device such as a hard disk built in the computer system.

Furthermore, the "computer-readable recording medium" includes a medium that stores a program for a certain period of time, such as a volatile memory (for example, a dynamic random access memory (DRAM)) inside a computer system which serves as a server or a client when a program is transmitted via a network such as the Internet or a communication line such as a telephone line.

The above program may be transmitted from a computer system that stores the program in a storage device or the like to another computer system via a transmission medium or by a transmission wave in the transmission medium. Here, the "transmission medium" for transmitting the program refers to a medium having a function of transmitting information, such as a network (communication network) such as the Internet or a communication line (communication cable) such as a telephone line.

Also, the program may be for realizing some of the functions described above. Furthermore, the program may be a so-called differential file (differential program) that can realize the functions described above in combination with a program already recorded in the computer system.

What is claimed is:

1. An image forming apparatus comprising:
   a storage device; and
   a processor configured to:
   store image data created by executing a scan job or a print job in the storage device;
   create an information code representing information indicating a storage area of the storage device in which the image data is stored;
   output the created information code to a display configured to display the information code so as to cause the display to display the information code;
   receive an acquisition request including information indicating the storage area of the storage device;
   transmit the image data to a terminal after receiving the acquisition request; and
   cause the display to cease to display the information code after transmitting the image data to the terminal.

2. The image forming apparatus according to claim 1, wherein the information code is a two-dimensional information code representing information indicating the storage area of the storage device.

3. The image forming apparatus according to claim 1, wherein the information code is configured to cause the terminal to display an image with a web browser when the terminal reads the information code.

4. The image forming apparatus according to claim 1, wherein the information code is configured to cause the terminal to display an image when the terminal reads the information code by operating an activated application.

5. The image forming apparatus according to claim 1, wherein the information indicating the storage area of the storage device includes a uniform resource locator (URL) of a file storing the image data.

6. The image forming apparatus according to claim 5, wherein the information code is a two-dimensional information code representing information indicating the storage area of the storage device.

7. The image forming apparatus according to claim 5, wherein the information code is configured to cause the terminal to display an image with a web browser when the terminal reads the information code.

8. The image forming apparatus according to claim 5, wherein the information code is configured to cause the terminal to display an image when the terminal reads the information code by operating an activated application.

9. The image forming apparatus according to claim 2, wherein the information indicating the storage area of the storage device includes a uniform resource locator (URL) of a file storing the image data.

10. A method of creating information codes in an image forming apparatus, the method comprising:
    storing, using a storage device, image data created by executing a scan job or a print job by the image forming apparatus;
    creating, by a processor of the image forming apparatus, an information code representing information indicating a storage area of the storage device in which the image data is stored;
    outputting, by the processor, the information code to a display configured to display the information code so as to cause the display to display the information code;
    receiving, by the processor, an acquisition request including information indicating the storage area of the storage device;
    transmitting, by the processor, the image data to a terminal after receiving the acquisition request; and
    causing, by the processor, the display to cease to display the information code after transmitting the image data to the terminal.

11. The method according to claim 10, wherein the information code is a two-dimensional information code representing information indicating the storage area of the storage device.

12. The method according to claim 10, further comprising:
    reading, by the terminal, the information code; and
    displaying, by the terminal, an image with a web browser after reading the information code.

13. The method according to claim 10, further comprising:
    reading, by the terminal, the information code by operating an activated application; and
    displaying, by the terminal, an image after reading the information code.

14. The method according to claim 10, further comprising:
- accessing, by the terminal, the image data; and
- controlling, by the processor, the display to cease to display the information code when the terminal accesses the image data.

15. The method according to claim 10, wherein the information indicating the storage area of the storage device includes a uniform resource locator (URL) of a file storing the image data.

16. The method according to claim 10, further comprising:
- creating, by a server, a screen for providing the image data, and
- transmitting, by the server, the created screen to the terminal for display.

17. The method according to claim 10, wherein the image forming apparatus includes the storage device.

\* \* \* \* \*